US012764052B2

(12) United States Patent
Abdulla et al.

(10) Patent No.: US 12,764,052 B2
(45) Date of Patent: Oct. 13, 2026

(54) OPTIMIZING BORDER GATEWAY PROTOCOL GRACEFUL SHUTDOWN

(71) Applicant: Juniper Networks, Inc., Sunnyvale, CA (US)

(72) Inventors: Abdul Zubaidhar Abdulla, Bangalore (IN); Abhishek Asthana, Bangalore (IN); Srihari Ramachandra Sangli, Bengaluru (IN)

( * ) Notice: Subject to any disclaimer, the term of this patent is extended or adjusted under 35 U.S.C. 154(b) by 5 days.

(21) Appl. No.: 18/419,797

(22) Filed: Jan. 23, 2024

(65) Prior Publication Data

US 2025/0240231 A1 Jul. 24, 2025

(51) Int. Cl.
*H04L 45/02* (2022.01)
*H04L 45/42* (2022.01)

(52) U.S. Cl.
CPC .............. *H04L 45/02* (2013.01); *H04L 45/42* (2013.01)

(58) Field of Classification Search
CPC ......... H04L 45/02; H04L 45/42; H04L 45/08; H04L 45/04; H04L 45/22; H04L 45/122; H04L 45/125
See application file for complete search history.

(56) References Cited

U.S. PATENT DOCUMENTS 9,628,371 B2 * 4/2017 Hui ......................... H04L 45/28
2005/0177634 A1 * 8/2005 Scudder .................. H04L 45/02 709/225
2012/0269198 A1 * 10/2012 Patel ..................... H04L 45/021 370/400
2017/0134308 A1 * 5/2017 Zhuang ................... H04L 49/25
2021/0109744 A1 * 4/2021 Hegde ................. G06F 16/2379
2024/0154897 A1 * 5/2024 Velayudhan ............ H04L 45/48
2024/0275712 A1 * 8/2024 Lin ..................... H04L 67/1095

FOREIGN PATENT DOCUMENTS

CN 102843618 A * 12/2012
EP 1999896 A2 12/2008

OTHER PUBLICATIONS

Chen, E. RFC 2918. “Route Refresh Capability for BGP-4”. (Year: 2000).*
Patel, K. and Chen, E. RFC 7313. “Enhanced Route Refresh Capability for BGP-4” (Year: 2014).*
Francois et al. RFC 8326. “Graceful BGP Session Shutdown”. (Year: 2018).*
Patel et al. RFC 8538. “Notification Message Support for BGP Graceful Restart” (Year: 2019).*

(Continued)

*Primary Examiner* — John M Macilwinen
(74) *Attorney, Agent, or Firm* — Harrity & Harrity, LLP

(57) ABSTRACT

An initiator network device may determine that a graceful shutdown is required for the initiator network device, and may generate a route refresh packet indicating that the graceful shutdown is enabled. The initiator network device may provide the route refresh packet to a receiver network device, and may disable the graceful shutdown after providing the route refresh packet to the receiver network device. The initiator network device may generate another route refresh packet indicating that the graceful shutdown is disabled, and may provide the other route refresh packet to the receiver network device.

20 Claims, 9 Drawing Sheets

(56) References Cited

OTHER PUBLICATIONS

E. Chen, "Route Refresh Capability for BGP-4," Network Working Group, Standards Track, Sep. 2000, 4 Pages.
Patel et al., "Enhanced Route Refresh Capability for BGP-4," Internet Engineering Task Force (IETF), Standards Track, Jul. 2014, 8 Pages.
Francois et al., "Graceful BGP Session Shutdown," Internet Engineering Task Force (IETF), Standards Track, Mar. 2018, 12 Pages.
Extended European Search Report for European Application No. EP24164634 dated Sep. 4, 2024, 11 pages.

* cited by examiner

OPTIMIZING BORDER GATEWAY PROTOCOL GRACEFUL SHUTDOWN

BACKGROUND

Border gateway protocol (BGP) graceful shutdown reduces or eliminates a loss of traffic associated with a link or a network device being shut down for maintenance.

SUMMARY

Some implementations described herein relate to a method. The method may include determining that a graceful shutdown is required for an initiator network device, and generating a route refresh packet indicating that the graceful shutdown is enabled. The method may include providing the route refresh packet to a receiver network device.

Some implementations described herein relate to a initiator network device. The initiator network device may include one or more memories and one or more processors. The one or more processors may be configured to determine that a graceful shutdown is required for the initiator network device, and generate a route refresh packet indicating that the graceful shutdown is enabled. The one or more processors may be configured to provide the route refresh packet to a receiver network device.

Some implementations described herein relate to a non-transitory computer-readable medium that stores a set of instructions. The set of instructions, when executed by one or more processors of an initiator network device, may cause the initiator network device to determine that a graceful shutdown is required for the initiator network device, and generate a route refresh packet indicating that the graceful shutdown is enabled. The set of instructions, when executed by one or more processors of the initiator network device, may cause the initiator network device to provide the route refresh packet to a receiver network device.

DETAILED DESCRIPTION

Figure 1A:
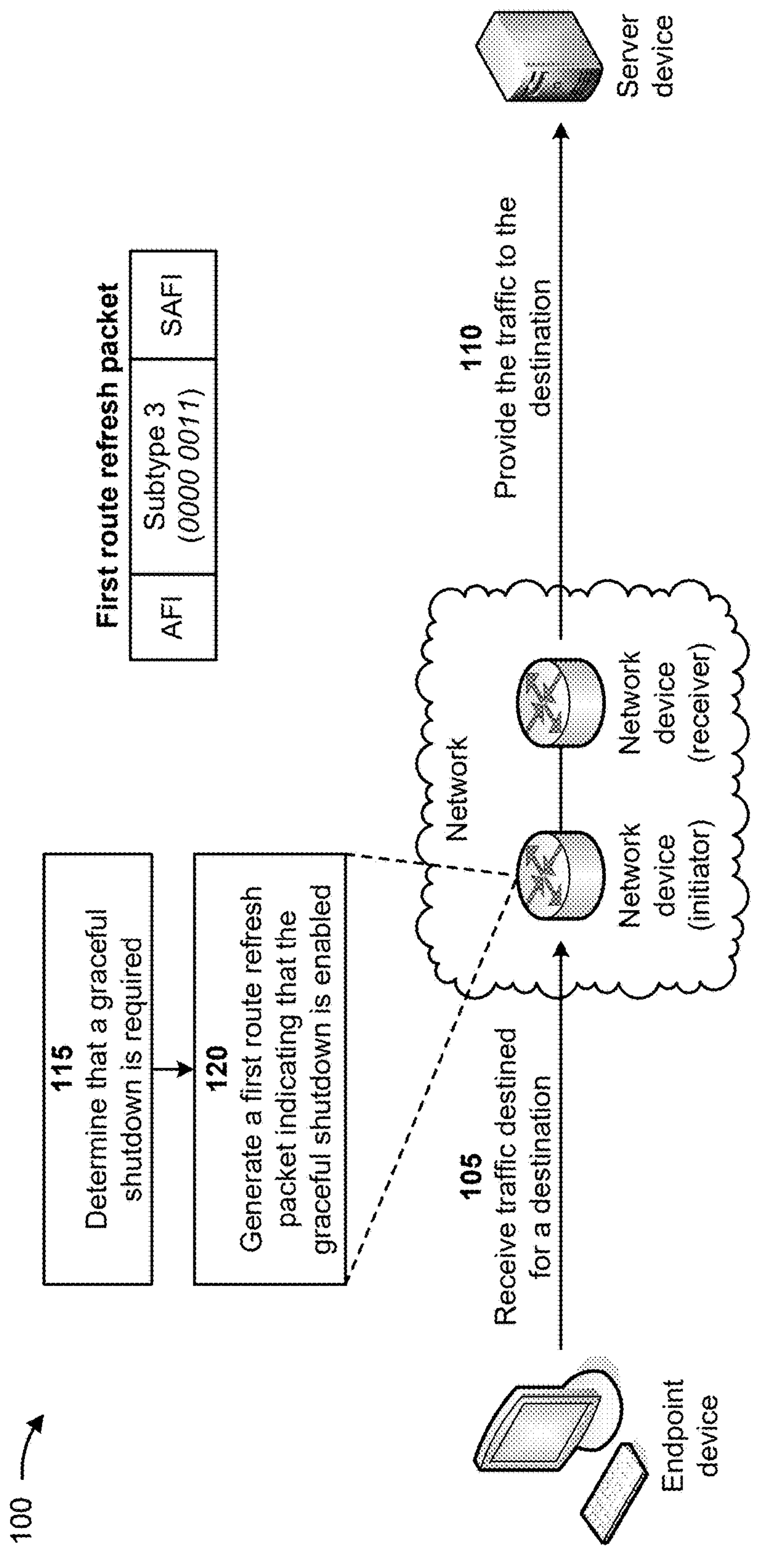
FIGS. 1A-1E are diagrams of an example associated with optimizing BGP graceful shutdown.

The following detailed description of example implementations refers to the accompanying drawings. The same reference numbers in different drawings may identify the same or similar elements.

During a BGP graceful shutdown, an initiator network device (e.g., to be shut down) may send an entire BGP routing table as permitted by an export policy to a receiver network device. BGP update packets may be generated by the initiator network device and may be processed by the receiver network device. In some cases, the initiator network device may provide the BGP routing table to a plurality of receiver network devices (e.g., a graceful shutdown community). The BGP routing table may enable the plurality of receiver network devices to avoid including the initiator network device in a forwarding route. After the receiver network device is shut down and restarted (e.g., rebooted), the initiator network device may send the same BGP routing table to the plurality of receiver network devices. This operation is very expensive and non-optimal in terms of processor cycles and network bandwidth associated with the initiator network device and the plurality of receiver network devices.

Thus, current techniques for performing BGP graceful shutdown consume computing resources (e.g., processing resources, memory resources, communication resources, and/or the like), networking resources, and/or the like, associated with providing a BGP routing table to all receiver network devices upon graceful shutdown of an initiator network device, providing the same BGP routing table to the receiver network devices after completion of the graceful shutdown of the initiator network, device utilizing network bandwidth associated with providing the BGP routing table twice to the receiver network devices, and/or the like.

Some implementations described herein relate to a network device that optimizes BGP graceful shutdown. For example, an initiator network device initiator network device may determine that a graceful shutdown is required for the initiator network device, and may generate a route refresh packet indicating that the graceful shutdown is enabled. The initiator network device may provide the route refresh packet to a receiver network device, and may disable the graceful shutdown after providing the route refresh packet to the receiver network device. The initiator network device may generate another route refresh packet indicating that the graceful shutdown is disabled, and may provide the other route refresh packet to the receiver network device.

In this way, the network device optimizes BGP graceful shutdown. For example, the BGP graceful shutdown feature may be simplified for both an initiator network device and receiver network devices. The initiator network device may optimize a quantity of BGP routing information to be provided to the receiver network devices during graceful shutdown of the initiator network device. Instead of providing the BGP routing table, the initiator network device may provide only an indication of a graceful shutdown state (e.g., enabled or disabled) of the initiator network device to the receiver network devices. The initiator network device may provide the indication of the graceful shutdown state via extensions of a BGP route refresh message (e.g., a first subtype indicating that the graceful shutdown is enabled and a second subtype indicating that the graceful shutdown is disabled). Thus, the network device conserves computing resources, networking resources, and/or the like that would otherwise have been consumed by providing a BGP routing table to all receiver network devices upon graceful shutdown of an initiator network device, providing the same BGP routing table to the receiver network devices after completion of the graceful shutdown of the initiator network device, utilizing network bandwidth associated with providing the BGP routing table twice to the receiver network devices, and/or the like.

FIGS. 1A-1E are diagrams of an example 100 associated with optimizing BGP graceful shutdown. As shown in FIGS. 1A-1E, example 100 includes an endpoint device and a server device associated with a network of network devices. Further details of the endpoint device, the server device, the network, and the network devices are provided elsewhere herein.

As shown in FIG. 1A, one network device may be an initiator network device (e.g., an initiator of a graceful shutdown) and another network device may be a receiver network device. As further shown in FIG. 1A, and by reference number 105, a network device may receive traffic destined for a destination. For example, the network device may receive, from the endpoint device, traffic destined for another endpoint device and/or the server device. In another example, the network device may receive, from the server device, traffic destined for the endpoint device. In some implementations, the network device may receive the traffic from another network device of the network.

As further shown in FIG. 1A, and by reference number 110, the network device may provide the traffic to the destination. For example, the network device may provide the traffic to another endpoint device, the server device and/or the like (e.g., the destination) via one or more other network devices. In some implementations, the network device may receive the traffic from the endpoint device, and the traffic may include a destination address of the server device. In such implementations, the network device may forward the traffic directly to the server device or may forward the traffic to another network device. The other network device may forward the traffic directly to the server device or may forward the traffic to still another network device. The traffic may continue to be forwarded by the network devices until the traffic is received by the server device.

As further shown in FIG. 1A, and by reference number 115, the initiator network device may determine that a graceful shutdown is required for the initiator network device. For example, a graceful shutdown (e.g., a BGP graceful shutdown) may be needed for the initiator network device to reduce or eliminate a loss of traffic associated with the initiator network device being shut down for maintenance. In some implementations, the initiator network device may be programmed to periodically shut down for maintenance, may be instructed to shut down for maintenance (e.g., by a network administrator, a network management system, and/or the like), may shut down for maintenance in response to an event (e.g., generation of an error, generation of an alarm, receipt of a software update, and/or the like), and/or the like. The initiator network device may determine that the graceful shutdown is required based on determining that the initiator network device is to be shut down for maintenance.

As further shown in FIG. 1A, and by reference number 120, the initiator network device may generate a first route refresh packet indicating that the graceful shutdown is enabled. For example, the initiator network device may generate the first route refresh packet based on determining that a graceful shutdown is required for the initiator network device. The first route refresh packet may indicate that the graceful shutdown is enabled for the initiator network device. The first route refresh packet may request peer network devices to resend routes (e.g., via an update message), and may include an address family identifier (AFI) field, a reserved bit field, and a subsequent address family identifier (SAFI) field. The first route refresh packet may redefine the reserved bit field as a message subtype associated with a graceful shutdown state of the initiator network device. For example, the reserved bit field may be set to a first subtype (e.g., [0000 0011] or Subtype 3) to indicate that graceful shutdown is changed from disabled to enabled for the initiator network device associated with the AFI and the SAFI.

Figure 1B:
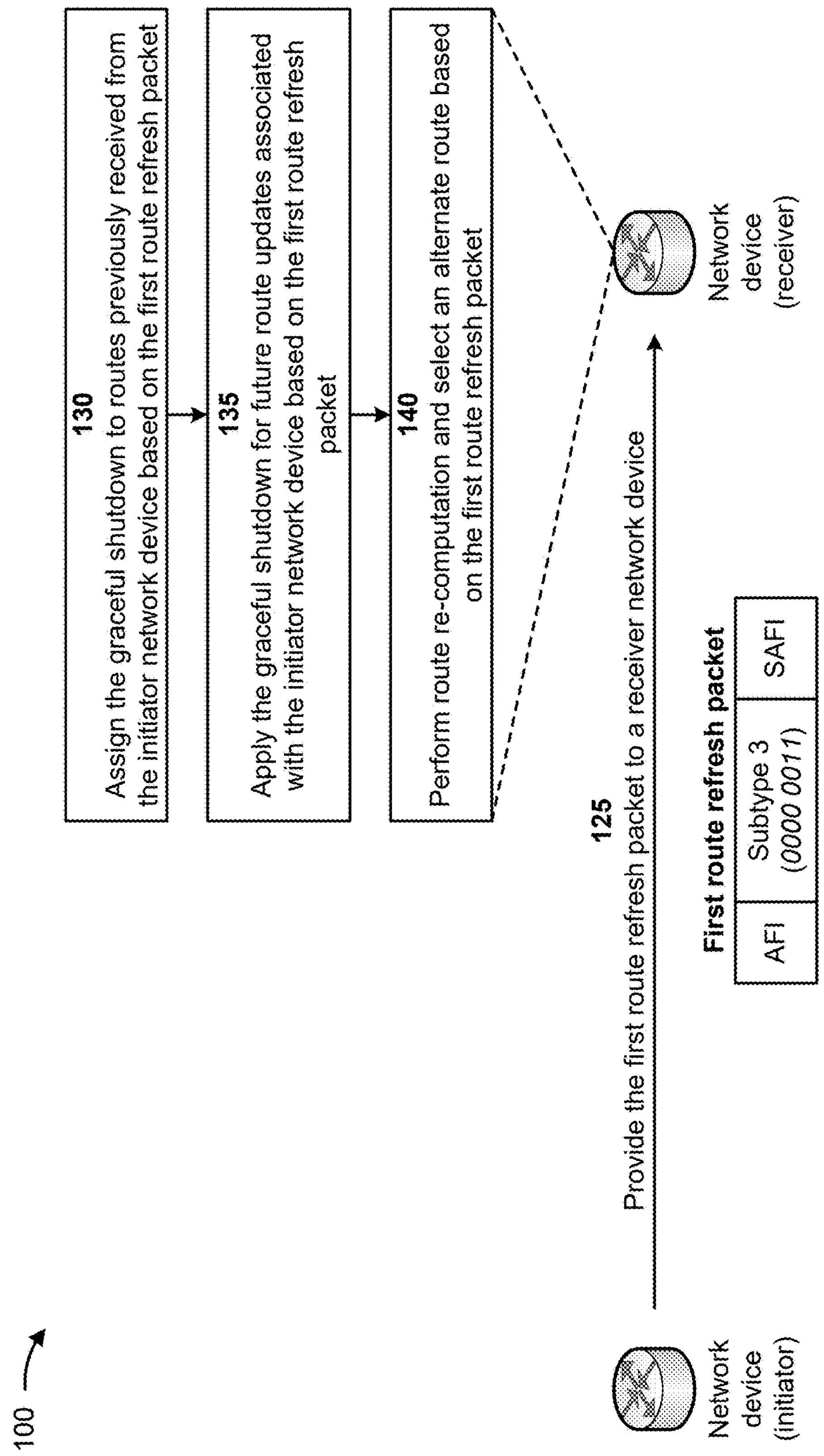

As shown in FIG. 1B, and by reference number 125, the initiator network device may provide the first route refresh packet to the receiver network device. For example, the initiator network device may be associated with a plurality of receiver network devices. The plurality of receiver network devices may include peer network devices of the initiator network device, such as network devices associated with traffic routes that include the initiator network device. In some implementations, the initiator network device may provide the first route refresh packet to each of the plurality of receiver network devices. Each of the plurality of receiver network devices may receive the first route refresh packet from the initiator network device.

As further shown in FIG. 1B, and by reference number 130, the receiver network device may assign the graceful shutdown to routes previously received from the initiator network device based on the first route refresh packet. For example, the receiver network device may apply a graceful shutdown process (e.g., that includes graceful shutdown actions) based on the first route refresh packet. In some implementations, the graceful shutdown process may include the receiver network device updating a local preference associated with the initiator network device and assigning the graceful shutdown to routes previously received from initiator network device. In this way, the receiver network device may avoid utilizing the routes previously received from the initiator network device (e.g., while the initiator network device is shut down).

As further shown in FIG. 1B, and by reference number 135, the receiver network device may apply the graceful shutdown for future route updates associated with the initiator network device based on the first route refresh packet. For example, the graceful shutdown process, implemented by the receiver network device based on the first route refresh packet, may include the receiver network device applying the graceful shutdown for future route updates associated with the initiator network device. In this way, the receiver network device may avoid utilizing any future route updates associated with initiator network device (e.g., while the initiator network device is shut down).

As further shown in FIG. 1B, and by reference number 140, the receiver network device may perform route re-computation and may select an alternate route based on the first route refresh packet. For example, the graceful shutdown process, implemented by the receiver network device based on the first route refresh packet, may include the receiver network device performing a route re-computation for routes associated with the initiator network device (e.g., to eliminate the initiator network device from the routes), selecting an alternate route that does not include the initiator network device, and/or the like. In this way, the receiver network device may avoid utilizing any routes associated with the initiator network device (e.g., while the initiator network device is shut down).

Figure 1C:
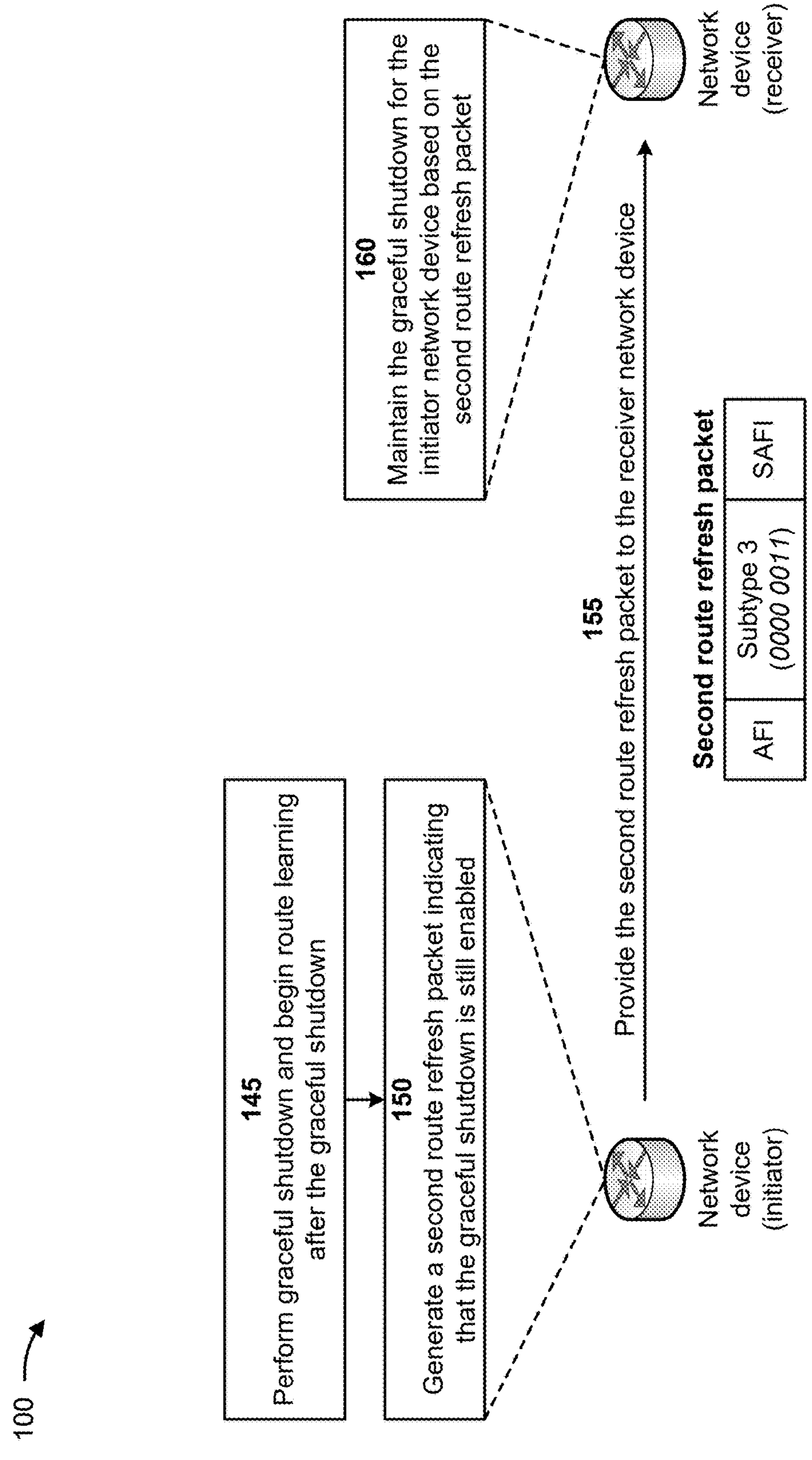

As shown in FIG. 1C, and by reference number 145, the initiator network device may perform the graceful shutdown and may begin route learning after the graceful shutdown. For example, the initiator network device may perform the graceful shutdown by shutting down (e.g., powering off) and rebooting (e.g., powering on). After rebooting, the initiator network device may begin route learning to identify routes associated with the receiver network device and one or more other receiver network devices.

As further shown in FIG. 1C, and by reference number 150, the initiator network device may generate a second route refresh packet indicating that the graceful shutdown is still enabled. For example, while the initiator network device is performing the route learning, the initiator network device may still be unavailable for processing traffic associated with the receiver network device. In order to prevent traffic from being provided to the initiator network device during the route learning, the initiator network device may generate the second route refresh packet indicating that the graceful shutdown is still enabled. The second route refresh packet may include an AFI field, a reserved bit field, and a SAFI field. The second route refresh packet may redefine the reserved bit field as a message subtype associated with a graceful shutdown state of the initiator network device. For example, the reserved bit field may be set to the first subtype (e.g., [0000 0011] or Subtype 3) to indicate that graceful shutdown is still enabled for the initiator network device associated with the AFI and the SAFI.

As further shown in FIG. 1C, and by reference number 155, the initiator network device may provide the second route refresh packet to the receiver network device. For example, the initiator network device may provide the second route refresh packet to each of the plurality of receiver network devices. Each of the plurality of receiver network devices may receive the second route refresh packet from the initiator network device.

As further shown in FIG. 1C, and by reference number 160, the receiver network device may maintain the graceful shutdown for the initiator network device based on the second route refresh packet. For example, the receiver network device may maintain the graceful shutdown process based on the second route refresh packet. In some implementations, the graceful shutdown process may include the receiver network device updating the local preference associated with the initiator network device, assigning the graceful shutdown to the routes previously received from initiator network device, applying the graceful shutdown for future route updates associated with the initiator network device, performing the route re-computation for routes associated with the initiator network device, selecting the alternate route that does not include initiator network device, and/or the like.

Figure 1D:
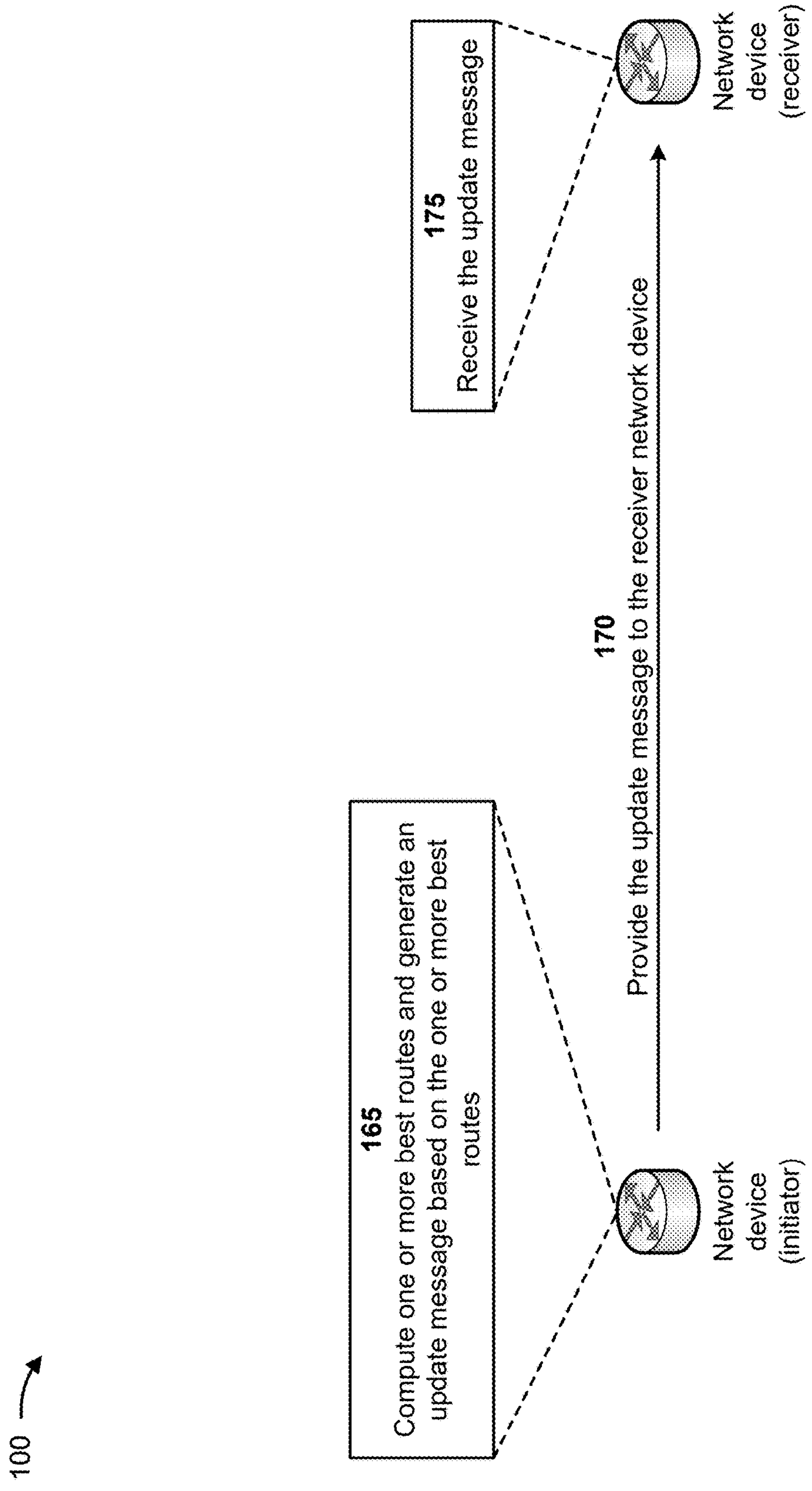

As shown in FIG. 1D, and by reference number 165, the initiator network device may compute one or more best routes and may generate an update message based on the one or more best routes. For example, based on the route learning, the initiator network device may identify routes associated with the receiver network device and one or more other receiver network devices. In some implementations, the initiator network device may utilize the identified routes to compute one or more best routes associated with the receiver network devices. For example, the initiator network device may include one or more of the identified routes with a fewest quantity of next hops in the one or more best routes, may include one or more of the identified routes with the most bandwidth in the one or more best routes, may include one or more of the identified routes with a greatest traffic throughput in the one or more best routes, and/or the like. In some implementations, the initiator network device may generate an update message that identifies the one or more best routes associated with the receiver network devices.

As further shown in FIG. 1D, and by reference number 170, the initiator network device may provide the update message to the receiver network device. For example, the initiator network device may provide the update message to the receiver network device. In some implementations, the initiator network device may provide the update message to one or more other receiver network devices.

As further shown in FIG. 1D, and by reference number 175, the receiver network device may receive the update message. For example, the receiver network device may receive the update message from the initiator network device. In some implementations, the one or more other receiver network devices may receive the update message from the initiator network device.

Figure 1E:
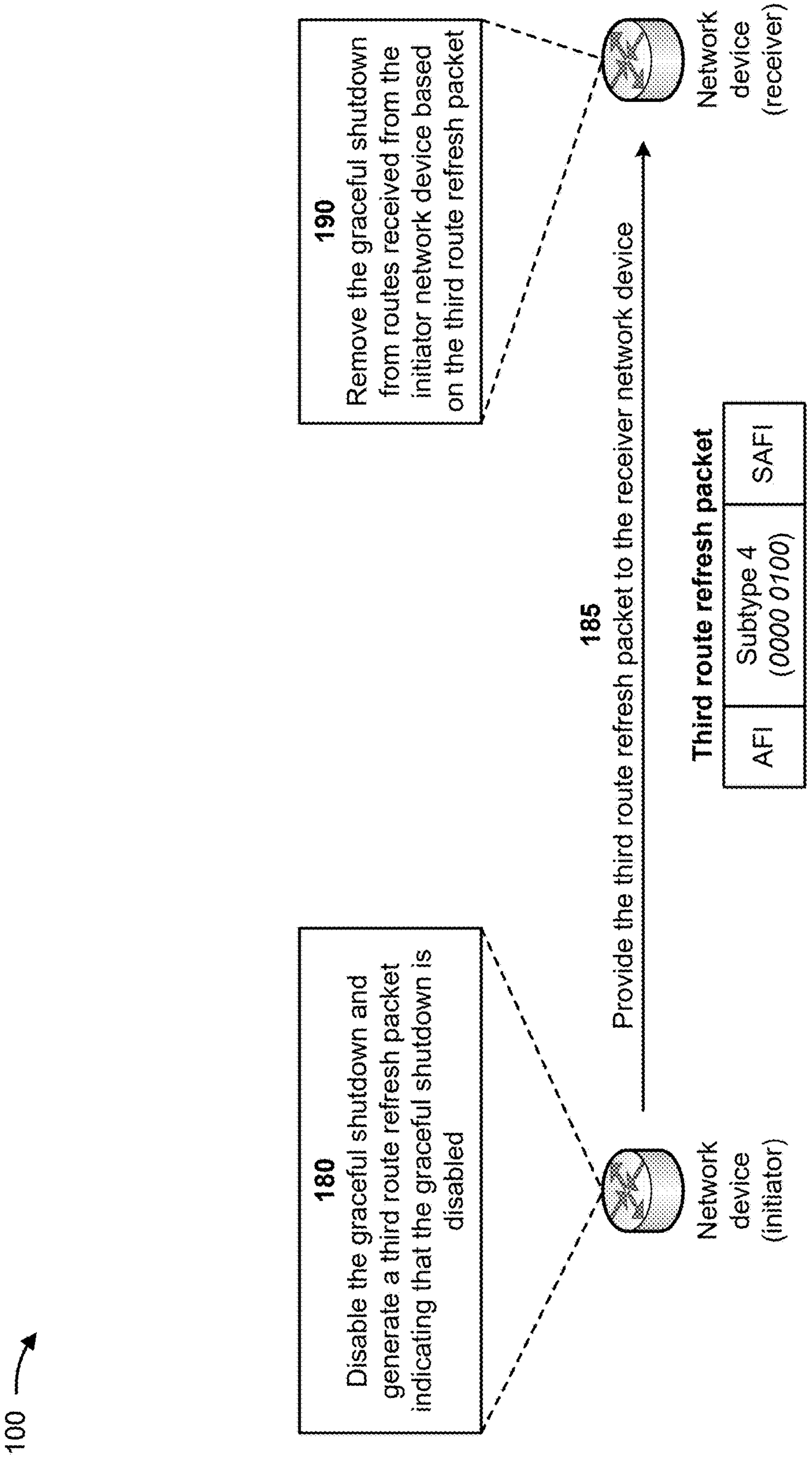

As shown in FIG. 1E, and by reference number 180, the initiator network device may disable the graceful shutdown and may generate a third route refresh packet indicating that the graceful shutdown is disabled. For example, after providing the update message to the receiver network device and the one or more other receiver network devices, the initiator network device may disable the graceful shutdown of the initiator network device. After disabling the graceful shutdown, the initiator network device may generate the third route refresh packet indicating that the graceful shutdown is disabled. The third route refresh packet may include an AFI field, a reserved bit field, and a SAFI field. The third route refresh packet may redefine the reserved bit field as a message subtype associated with a graceful shutdown state of the initiator network device. For example, the reserved bit field may be set to a second subtype (e.g., [0000 0100] or Subtype 4) to indicate that graceful shutdown is changed from enabled to disabled for the initiator network device associated with the AFI and the SAFI.

As further shown in FIG. 1E, and by reference number 185, the initiator network device may provide the third route refresh packet to the receiver network device. For example, the initiator network device may provide the third route refresh packet to the receiver network device and one or more other receiver network devices. The receiver network device and the one or more other receiver network devices may receive the third route refresh packet from the initiator network device.

As further shown in FIG. 1E, and by reference number 190, the receiver network device may remove the graceful shutdown from routes received from the initiator network device based on the third route refresh packet. For example, the receiver network device may apply a reverse graceful shutdown process (e.g., that includes reverse graceful shutdown actions) based on the third route refresh packet. In some implementations, the reverse graceful shutdown process may include the receiver network device updating the local preference associated with the initiator network device and removing the graceful shutdown from routes received from initiator network device. The receiver network device may not apply the graceful shutdown process to any future routes associated with the initiator network device.

In some implementations, the initiator network device may generate new BGP packet type to notify receiver network devices about a graceful shutdown state of the initiator network device, to notify receiver network devices about other states of the initiator network device, and/or the like. In some implementations, the initiator network device may extend a new path attribute in a BGP update message to notify receiver network devices about a graceful shutdown state of the initiator network device.

In this way, the network device optimizes BGP graceful shutdown. For example, the BGP graceful shutdown feature may be simplified for both an initiator network device and receiver network devices. The initiator network device may optimize a quantity of BGP routing information to be provided to the receiver network devices during graceful shutdown of the initiator network device. Instead of providing the BGP routing table, the initiator network device may provide only an indication of a graceful shutdown state (e.g., enabled or disabled) of the initiator network device to the receiver network devices. The initiator network device may provide the indication of the graceful shutdown state via extensions of a BGP route refresh message (e.g., a first subtype indicating that the graceful shutdown is enabled and a second subtype indicating that the graceful shutdown is disabled). Thus, the network device conserves computing resources, networking resources, and/or the like that would otherwise have been consumed by providing a BGP routing table to all receiver network devices upon graceful shutdown of an initiator network device, providing the same BGP routing table to the receiver network devices after completion of the graceful shutdown of the initiator network device, utilizing network bandwidth associated with providing the BGP routing table twice to the receiver network devices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
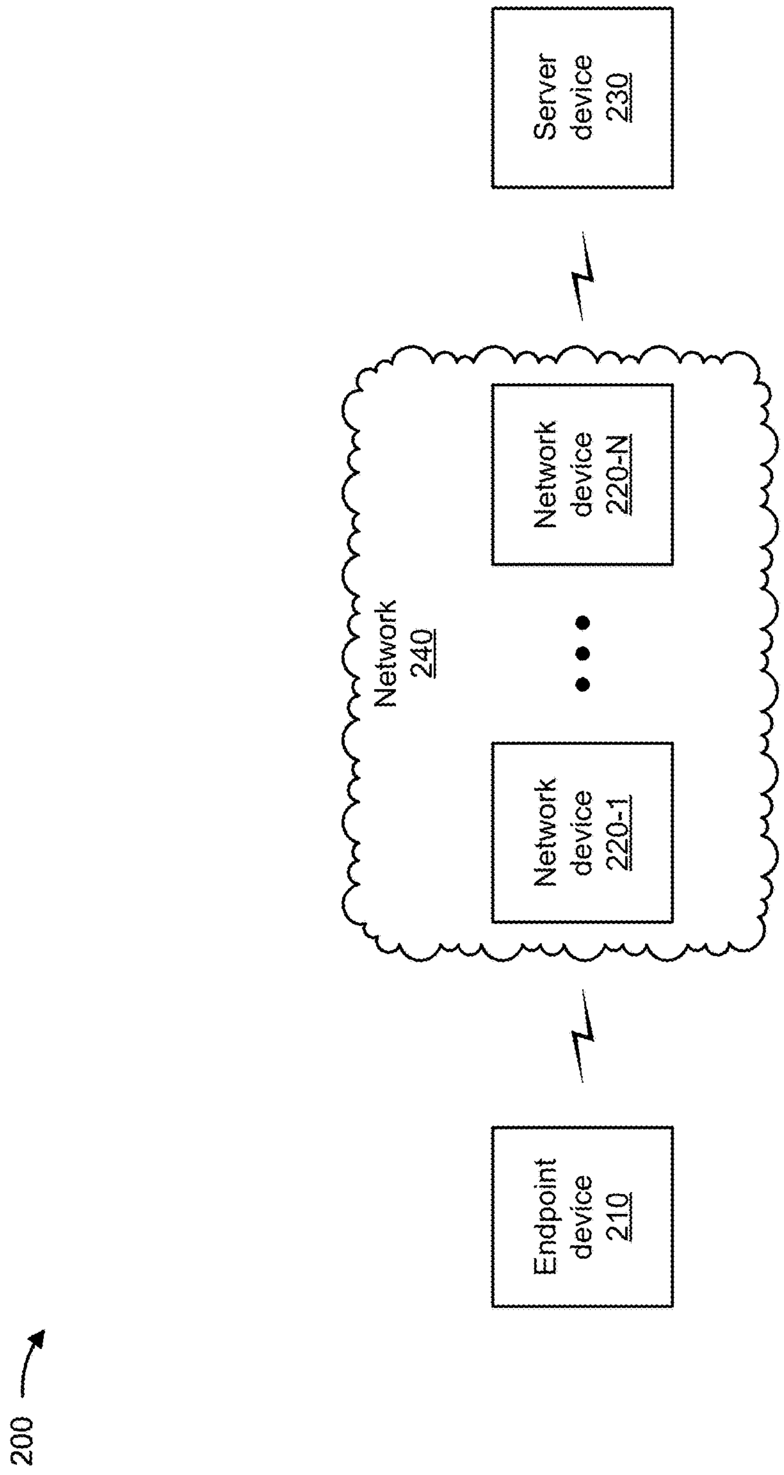
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a WAN, a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
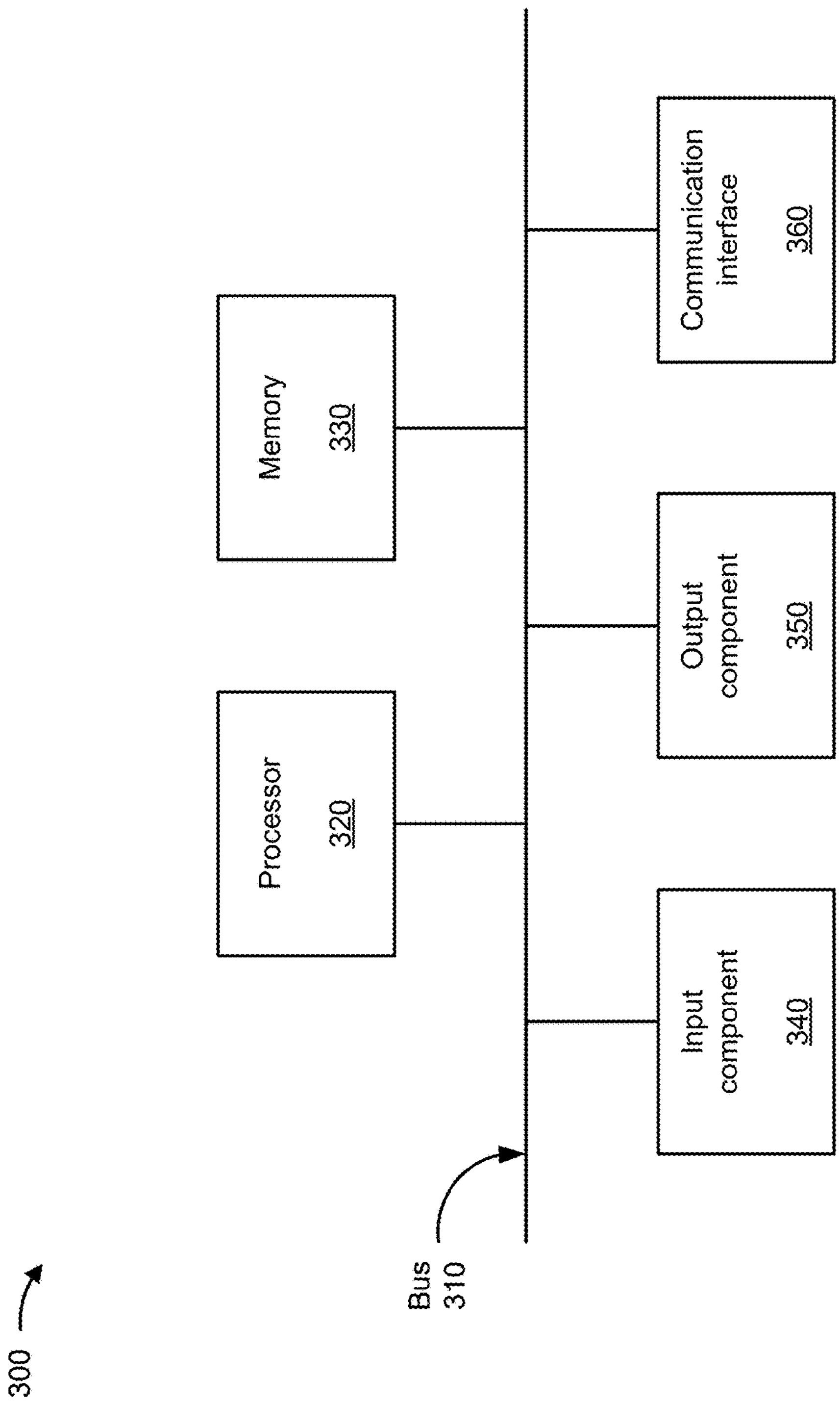
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
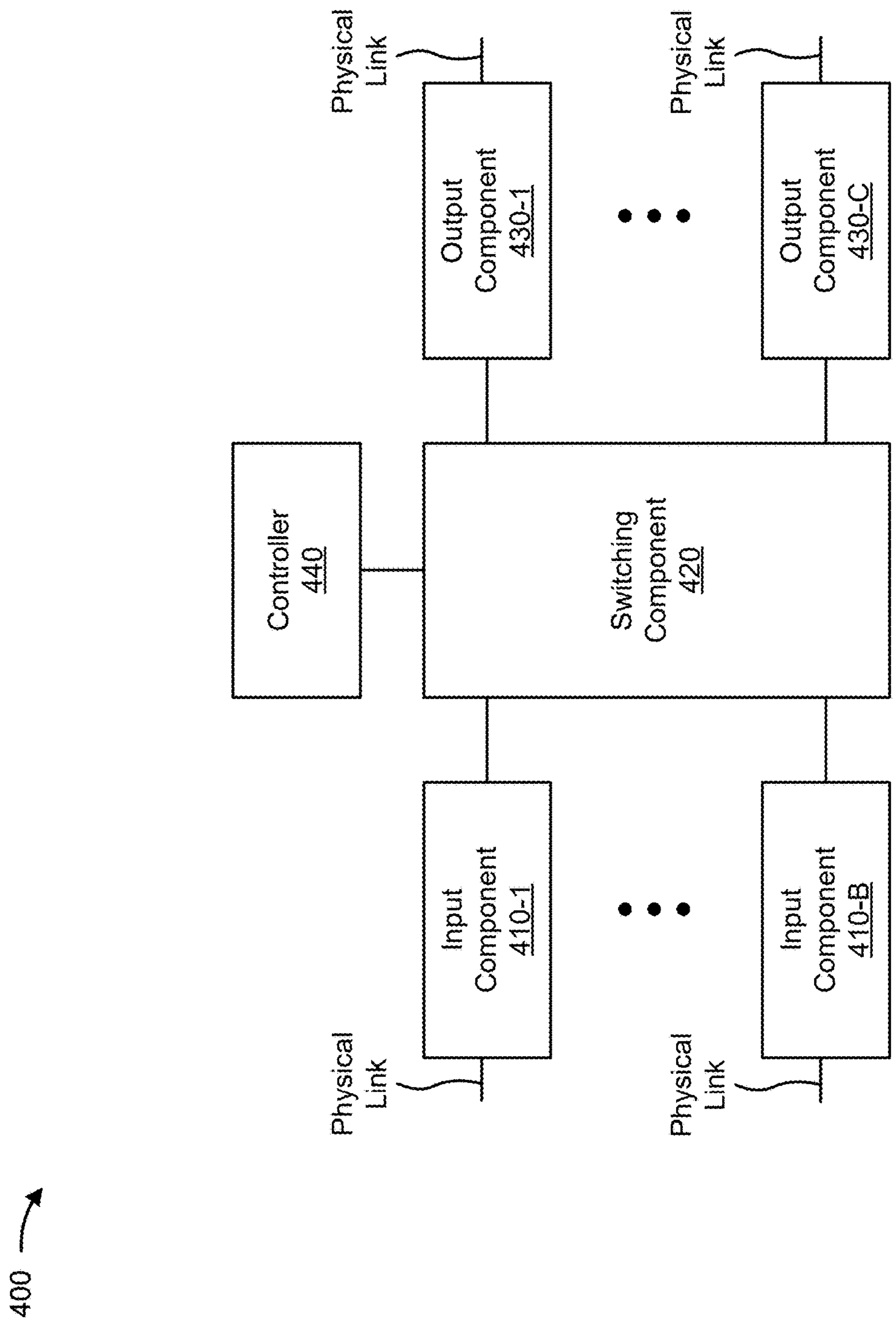

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
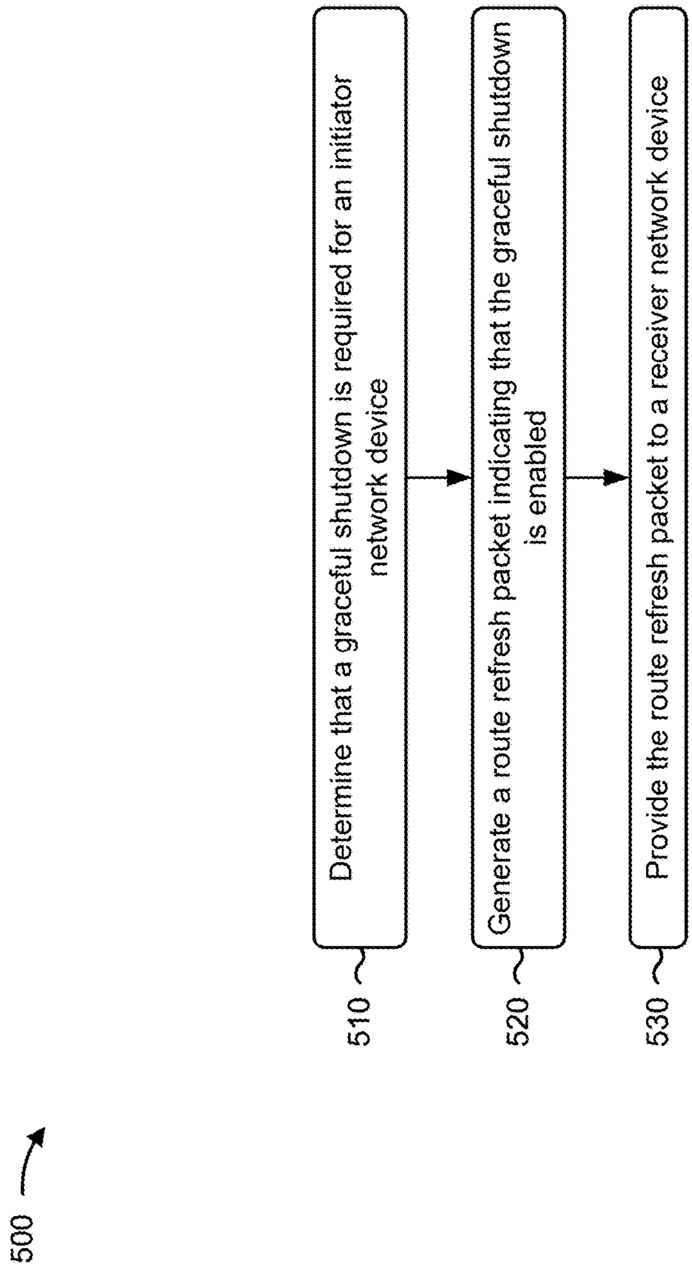
FIG. 5 is a flowchart of an example process for optimizing BGP graceful shutdown.

FIG. 5 is a flowchart of an example process 500 for optimizing BGP graceful shutdown. In some implementations, one or more process blocks of FIG. 5 may be performed by a network device (e.g., the network device 220). In some implementations, one or more process blocks of FIG. 5 may be performed by another device or a group of devices separate from or including the network device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining that a graceful shutdown is required for the initiator network device (block 510). For example, the initiator network device may determine that a graceful shutdown is required for the initiator network device, as described above.

As further shown in FIG. 5, process 500 may include generating a route refresh packet indicating that the graceful shutdown is enabled (block 520). For example, the initiator network device may generate a route refresh packet indicating that the graceful shutdown is enabled, as described above. In some implementations, the route refresh packet includes a subtype indicating that the graceful shutdown is enabled for the initiator network device.

As further shown in FIG. 5, process 500 may include providing the route refresh packet to a receiver network device (block 530). For example, the initiator network device may provide the route refresh packet to a receiver network device, as described above. In some implementations, the receiver network device is to maintain the graceful shutdown for the initiator network device based on the route refresh packet. In some implementations, the receiver network device is to assign the graceful shutdown to routes previously received from the initiator network device based on the route refresh packet.

In some implementations, process 500 includes disabling the graceful shutdown after providing the route refresh packet to the receiver network device, generating another route refresh packet indicating that the graceful shutdown is disabled, and providing the other route refresh packet to the receiver network device. In some implementations, the receiver network device is to remove the graceful shutdown from routes received from the initiator network device based on the other route refresh packet. In some implementations, the other route refresh packet includes a subtype indicating that the graceful shutdown is disabled for the initiator network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by an initiator network device, that a border gateway protocol (BGP) graceful shutdown is to be enabled for the initiator network device;

generating, by the initiator network device, a BGP route refresh packet comprising an address family identifier (AFI) field, a reserved bit field set to indicate a first subtype, and a subsequent address family identifier (SAFI) field, wherein the first subtype indicates that the initiator network device is in a BGP graceful shutdown state, and indicates that a receiver network device is to associate routes received from the initiator network device with BGP graceful shutdown; and providing the BGP route refresh packet to the receiver network device;

disabling the BGP graceful shutdown state after providing the BGP route refresh packet to a receiver network device;

generating, by the initiator network device and based on disabling the BGP graceful shutdown state, another BGP route refresh packet comprising the AFI field, the reserved bit field set to indicate a second subtype, and the SAFI field, wherein the second subtype indicates that the BGP graceful shutdown state of the initiator network device is disabled; and providing the other BGP route refresh packet to the receiver network device.

2. The method of claim 1, wherein the receiver network device is to maintain a BGP graceful shutdown state for the initiator network device based on the BGP route refresh packet.

3. The method of claim 1, further comprising:

disabling the BGP graceful shutdown after providing the BGP route refresh packet to the receiver network device.

4. The method of claim 3, wherein the receiver network device is to remove the BGP graceful shutdown from routes received from the initiator network device based on the other BGP route refresh packet.

5. The method of claim 3, wherein the other BGP route refresh packet includes the reserved bit field having another value that indicates that the BGP graceful shutdown is changed from enabled to disabled.

6. The method of claim 1, wherein the receiver network device is to perform a route re-computation for routes previously associated with the initiator network device based on the BGP route refresh packet.

7. The method of claim 1, further comprising: rebooting the initiator network device;

generating yet another BGP route refresh packet indicating that the BGP graceful shutdown is still enabled; and performing route learning to identify routes associated with the receiver network device.

8. A initiator network device, comprising:

one or more memories; and one or more processors to:

determine that a border gateway protocol (BGP) graceful shutdown is to be enabled for the initiator network device;

generate a BGP route refresh packet comprising an address family identifier (AFI) field, a reserved bit field set to indicate a first subtype, and a subsequent address family identifier (SAFI) field, wherein the first subtype indicates that the initiator network device is in a BGP graceful shutdown state, and indicates that a receiver network device is to associate routes received from the initiator network device with BGP graceful shutdown; and provide the BGP route refresh packet to the receiver network device;

disable the BGP graceful shutdown state after providing the BGP route refresh packet to a receiver network device;

generate, based on disabling the BGP graceful shutdown state, another BGP route refresh packet comprising the AFI field, the reserved bit field set to indicate a second subtype, and the SAFI field, wherein the second subtype indicates that the BGP graceful shutdown state of the initiator network device is disabled; and providing the other BGP route refresh packet to the receiver network device.

9. The initiator network device of claim 8, wherein the receiver network device is to maintain a BGP graceful shutdown state for the initiator network device based on the BGP route refresh packet.

10. The initiator network device of claim 8, wherein the one or more processors are further to:

disable the BGP graceful shutdown after providing the BGP route refresh packet to the receiver network device.

11. The initiator network device of claim 10, wherein the receiver network device is to remove the BGP graceful shutdown from routes received from the initiator network device based on the other BGP route refresh packet.

12. The initiator network device of claim 10, wherein the other BGP route refresh packet includes the reserved bit field having another value that indicates that the BGP graceful shutdown is changed from enabled to disabled.

13. The initiator network device of claim 8, wherein the receiver network device is to perform a route re-computation for routes previously associated the initiator network device based on the BGP route refresh packet.

14. The initiator network device of claim 8, wherein the one or more processors are further to:

reboot the initiator network device;

generate yet another BGP route refresh packet indicating that the BGP graceful shutdown is still enabled; and perform route learning to identify routes associated with the receiver network device.

15. A non-transitory computer-readable medium storing a set of instructions, the set of instructions comprising:

one or more instructions that, when executed by one or more processors of an initiator network device, cause the initiator network device to:

determine that a border gateway protocol (BGP) graceful shutdown is to be enabled for the initiator network device;

generate a BGP route refresh packet comprising an address family identifier (AFI) field, a reserved bit field set to indicate a first subtype, and a subsequent address family identifier (SAFI) field, wherein the first subtype indicates that the initiator network device is in a BGP graceful shutdown state, and indicates that a receiver network device is to associate routes received from the initiator network device with BGP graceful shutdown; and provide the BGP route refresh packet to the receiver network device;

disable the BGP graceful shutdown state after providing the BGP route refresh packet to a receiver network device;

generate, based on disabling the BGP graceful shutdown state, another BGP route refresh packet comprising the AFI field, the reserved bit field set to indicate a second subtype, and the SAFI field, wherein the second subtype indicates that the BGP graceful shutdown state of the initiator network device is disabled; and provide the other BGP route refresh packet to the receiver network device.

16. The non-transitory computer-readable medium of claim 15, wherein the one or more instructions further cause the initiator network device to maintain a BGP graceful shutdown state for the initiator network device based on the BGP route refresh packet.

17. The non-transitory computer-readable medium of claim 15, wherein the one or more instructions further cause the initiator network device to:

disable the BGP graceful shutdown after providing the BGP route refresh packet to the receiver network device.

18. The non-transitory computer-readable medium of claim 17, wherein the one or more instructions further cause the initiator network device to remove the BGP graceful shutdown from routes received from the initiator network device based on the other BGP route refresh packet.

19. The non-transitory computer-readable medium of claim 17, wherein the other BGP route refresh packet includes the reserved bit field having another value that indicates that the BGP graceful shutdown is changed from enabled to disabled.

20. The non-transitory computer-readable medium of claim 15, wherein the one or more instructions further cause the initiator network device to:

reboot the initiator network device;

generate yet another BGP route refresh packet indicating that the BGP graceful shutdown is still enabled; and perform route learning to identify routes associated with the receiver network device.

* * * * *